United States Patent [19]

Watanabe et al.

[11] Patent Number: 4,512,239
[45] Date of Patent: Apr. 23, 1985

[54] VEHICLE AIR DUCT CONSTRUCTION USING CENTER CONSOLE BOX

[75] Inventors: Toshimitu Watanabe; Masayuki Sakai; Kazutoshi Minami; Shigeji Takumi, all of Toyota, Japan

[73] Assignee: Toyota Jidosha Kabushiki Kaisha, Toyota, Japan

[21] Appl. No.: 460,791

[22] Filed: Jan. 25, 1983

[30] Foreign Application Priority Data

Jan. 29, 1982 [JP] Japan ............................. 57-11170[U]

[51] Int. Cl.$^3$ ............................................... B60H 1/24
[52] U.S. Cl. ...................................... 98/2.03; 98/2.05
[58] Field of Search ............... 98/2, 2.03, 2.05, 2.06, 98/2.07, 2.08

[56] References Cited

U.S. PATENT DOCUMENTS

| | | | |
|---|---|---|---|
| 1,966,882 | 7/1934 | Bucklen | 98/2.05 X |
| 2,835,183 | 5/1958 | Miller et al. | 98/2 |
| 2,996,255 | 8/1961 | Boylan | 98/2.01 X |
| 3,550,522 | 12/1970 | Bauer | 98/2.07 |
| 4,343,230 | 8/1982 | Lundström | 98/2.05 |

FOREIGN PATENT DOCUMENTS 3557  1/1980  Japan ................................. 98/38 R Primary Examiner—Harold Joyce
Attorney, Agent, or Firm—Oblon, Fisher, Spivak, McClelland & Maier

[57] ABSTRACT

A vehicle which incorporates an air treatment unit mounted underneath the front instrument panel. A hollow center console box extends along the center of the floor of the vehicle passenger compartment in the longitudinal direction. An opening at the front end of the console box is connected to an air outlet of the air treatment unit, and an opening at the rear end of the console box opens towards a space defined underneath the front seating assembly of the vehicle between it and the floor. Thus treated air is led from the air treatment unit through the hollow console box and is emitted towards the space under the front seating assembly so as to pass therefrom into the rear seating space behind the front seating assembly, and there is no risk that the feet of a person seated on the front seating assembly obstruct this flow of treated air to the space underneath the front seating assembly.

4 Claims, 3 Drawing Figures

U.S. Patent  Apr. 23, 1985  4,512,239
FIG. 1
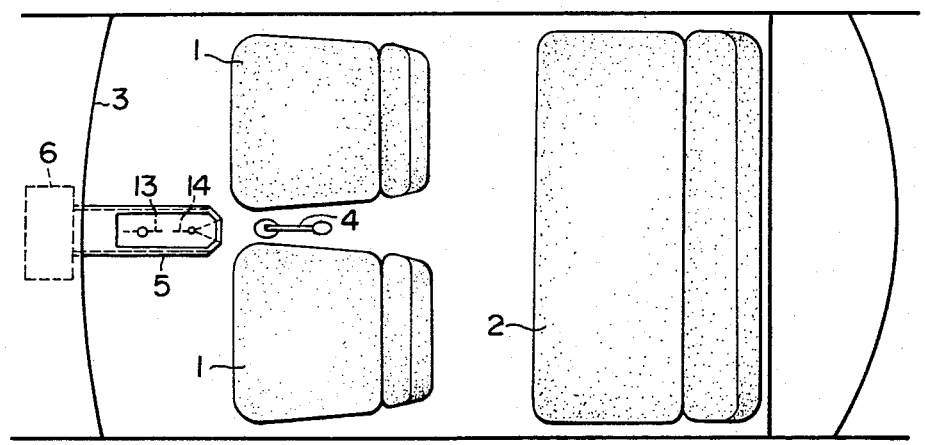
FIG. 2
FIG. 3
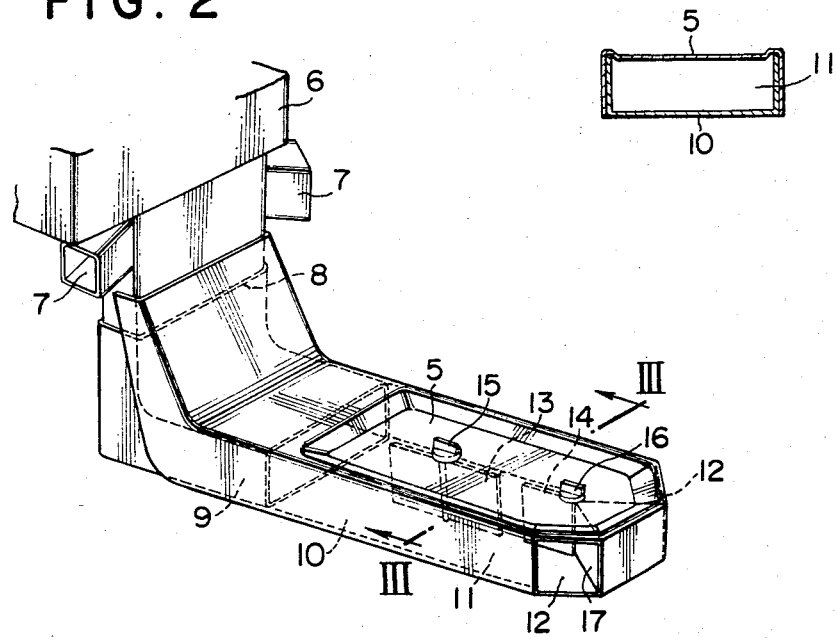

VEHICLE AIR DUCT CONSTRUCTION USING CENTER CONSOLE BOX

BACKGROUND OF THE INVENTION

The present invention relates to an air duct construction for a vehicle, and more particularly relates to such an air duct construction for leading air, which has been heated or cooled by a heater or an air conditioner of a vehicle provided in front of the front seat or seats of the vehicle, to the rear seating space thereof.

In a vehicle, which may incorporate a front seating assembly as either a single bench seat or a pair of bucket seats and typically somewhat raised up from the floor of the vehicle to leave an underneath space, a unit for providing air to the interior of the passenger compartment of the vehicle is typically provided in front of the front seating assembly, under the instrument panel of the vehicle, and further is typically centrally located with regard to the transverse dimension of the vehicle. Such a unit may either be an air heater or an air cooler, both of which will be hereinafter referred to as "air treatment unit"; the present invention applies equally to both cases.

During the operation of such an air treatment unit, it injects from its air outlet port or ports heated or cooled air (hereinafter referred to as "treated air") into the passenger compartment of the vehicle, and in the prior art typically this flow of treated air is directed from this outlet port or ports towards the feet of persons seated on the front seating assembly. In such a construction, it is expected that part of this treated air will flow through the aforementioned underneath space under the front seating assembly to reach the space in front of the rear seating assembly of the vehicle, so as to impinge upon the feet of persons seated on the rear seating assembly, and thereafter generally to provide a supply of treated air in the rear seating space of the vehicle. However, these expectations are not always properly fulfilled, because the feet of persons seated on the front seating assembly often obstruct this flow of treated air under the front seating assembly, so that this flow of air does not pass properly towards the rear seating assembly, and in such a case the treating of the air in the rear seating space of the vehicle, and particularly of the air impinging on the feet of persons seated on the rear seating assembly, becomes inadequate. Also, in such a case, the feet of such persons seated on the front seating assembly may suffer because of the overprovision of treated air, and may be overheated or overcooled, thus causing discomfort.

In order to improve the treating of the air in the rear seating space, in the prior art it has been proposed and practiced to provide a special air duct under the upper surface of the floor of the vehicle, for specially leading treated air to the rear seating space, the front end of said air duct being communicated to the air treatment unit and the rear end of said air duct opening to the rear seating space. This flow of treated air thus bypasses the aforesaid underneath space under the front seating assembly. This form of construction is certainly effective for improving the treating characteristic of the air in the rear seating space, but it has the disadvantage that such a special air duct is required to be quite long, and accordingly its provision is costly. Moreover the available space for persons within the passenger compartment of the vehicle is reduced, because the upper surface of the floor of the vehicle is required to be raised up in order to accomodate such an air duct. The convenience of the arrangements within the passenger compartment is also deteriorated, because it is difficult to form the upper surface of the floor as flat.

SUMMARY OF THE INVENTION

It is common in modern automobiles to provide a so called center console box, which extends from under the transversely central part of the instrument panel towards the rear of the vehicle, and typically the rear end of this center console box is located, in the longitudinal direction of the vehicle, just about at the front edge of the front seating assembly. In other words, in the case of the front seating assembly being constructed as two separate seats, the rear end of the center console box is located approximately between the two inner front corners of these front seats. The present inventors have conceived of the concept that such a center console assembly might be advantageously also utilized for the purpose of leading treated air to the rear seating space of the vehicle.

Accordingly, it is the primary object of the present invention to provide a novel construction for an air duct for an air treatment unit of a vehicle, which can improve the effectiveness of providing treated air to the rear seating space.

It is a further object of the present invention to provide such a construction for an air duct, which effectively avoids the situation where the feet of persons seated on the front seating assembly of the vehicle obstruct the flow of treated air to the rear seating space.

It is a further object of the present invention to provide such a construction for an air duct, which advantageously utilizes such a center console box for also serving as said air duct.

It is a further object of the present invention to provide such a construction for an air duct, which improves provision of treated air in a comfortable manner to the vehicle passenger compartment as a whole.

It is a further object of the present invention to provide such a construction for an air duct, which does not oversupply treated air to the feet of persons seated on the front seating assembly.

It is a yet further object of the present invention to provide such a construction for an air duct, which allows the flow of treated air to the rear seating space to be biased to one side or another of the rear seating space, at the operator's will.

It is a further object of the present invention to provide such a construction for an air duct, which keeps the air duct as short as possible.

It is a yet further object of the present invention to provide such a construction for an air duct, which does not require the floor of the vehicle to be raised up.

It is a yet further object of the present invention to provide such a construction for an air duct, which allows the upper surface of the vehicle floor to remain flat.

It is a yet further object of the present invention to provide such a construction for an air duct, which maximizes the space available within the vehicle passenger compartment.

It is a yet further object of the present invention to provide such a construction for an air duct, which is inexpensive to manufacture.

According to the most general aspect of the present invention, these and other objects are accomplished by, in a vehicle which incorporates an front instrument panel, an air treatment unit fitted under said instrument panel which provides treated air from an air outlet thereof, a rear seating assembly before and above which is defined a rear seating space, and a floor on which is mounted a front seating assembly with an underneath space being defined between said front seating assembly and said floor; a construction for an air duct for leading treated air from said air outlet of said air treatment unit to said rear seating space, comprising: a hollow center console box which extends along the transversely central portion of the floor of the vehicle in the longitudinal direction of the vehicle, a front opening at the front end of said hollow center console box being communicated to said air outlet of said air treatment unit, and a rear opening at the rear end of said hollow center console box opening towards said space underneath said front seating assembly, a passage through said center console box leading from said front opening to said rear opening.

According to such a structure, the flow of treated air passes from the air outlet of the air treatment unit, into said opening at the front end of the hollow center console box, down through the hollow interior space of the center console box, and out of said opening at the rear end of the center console box into said space under the front seating assembly. This air flow then flows through said space under the front seating assembly to reach the rear seating space. There is no substantial risk that the feet of people seated on the front seating assembly should obstruct this flow of treated air, because these feet will generally be positioned at points on the floor of the vehicle which are further towards the front of the vehicle than said opening at the rear end of said hollow center console box, and accordingly will not be easily able to be interposed between said opening at the rear end of said center console box and said space underneath said front seating assembly in said air flow path. Accordingly, the effectiveness of transfer of treated air to said rear seating space is assured and the risk of discomfort to such feet due to oversupply of treated air is substantially eliminated. The center console box is thus utilized for two separate purposes, both in its normal function as a console box for which it is typically in any case provided and also as an air duct, and this efficiency of utilization ensures low cost and also a minimum space being occupied within the passenger compartment. Because the center console box typically does not extend rearwards much beyond the front edge of the front seating assembly, the floor of the vehicle rearward of this area may be made substantially flat, and no volume is required within the passenger compartment for provision of any air duct in this area.

Further, according to a more particular aspect of the present invention, these and other objects are more particularly and concretely accomplished by a construction for an air duct of the sort described above, wherein said rear opening at the rear end of said hollow center console box is substantially proximate to the front edge of said front seating assembly.

According to such structure, it is possible to avoid a situation where the feet of people seated on the front seating assembly obstruct the flow of treated air from the rear opening of the center console box, because treated air blows out from said rear opening directly into the space under the front seating assembly, and no substantial space is available therebetween for said feet to be situated so as to block said air flow.

Further, according to another more particular aspect of the present invention, these and other objects are assuredly accomplished by a construction for an air duct of the sort described above, said front seating assembly comprising a left individual front seat and a right individual front seat, wherein two such rear openings are provided at the rear end of said hollow center console box, a left one of said rear opening substantially opposing the space under the right hand front corner of said left front seat, and a right one of said rear openings substantially opposing the space under the left hand front corner of said right front seat.

According to such structure, treated air from the left one of said rear openings blows directly into the space under the left individual front seat and thence through to the left side portion of the rear seating space, and treated air from the right one of said rear openings blows directly into the space under the right individual front seat and thence through to the right side portion of the rear seating space.

Further, according to a yet more particular aspect of the present invention, these and other objects are more particularly and concretely accomplished by a construction for an air duct of the sort described above, further comprising a flap mounted within said passage through said center console box and pivoted around an axis, alteration of the angle of said flap altering the proportions of air flowing out through the one and the other of said two rear openings.

According to such a structure, as said flap is moved, the relative amounts of treated air that flow through the left and the right ones of said rear openings can be adjusted. Thus, the flow of treated air into the rear seating space can be directed to be more to the right hand side, or more to the left hand side, at the operator's will.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

FIG. 1 is a general plan view of the interior of the passenger compartment of an automobile which is equipped with the preferred embodiment of the air duct construction according to the present invention;

FIG. 2 is a perspective view of said air duct construction, and shows interior parts thereof by phantom lines; and FIG. 3 is a sectional view of a center console box incorporated in the air duct construction, taken in a plane shown by the arrows III—III in FIG. 2.

DETAILED DESCRIPTION OF THE PREFERRED EMBODIMENT

The present invention will now be described with reference to a preferred embodiment thereof, and with reference to the appended drawings. In FIG. 1, the reference numerals 1, 1 denote two individual bucket type front seats on a vehicle, and reference numeral indicates 2 is a rear bench seat of the vehicle. Although in the figures, each of the front seats 1 is elevated to a certain height above the floor of the vehicle by mounting brackets (also not shown), thus leaving an space underneath between it and the floor. Also a rear seating space is defined above and in front of the rear seat 2, and said spaces located underneath under the front seats 1 are communicated to said rear seating space. A front instrument panel 3 is provided in front of the front seats 1, and between the front seats 1 is located a parking or emergency brake lever 4. An air treatment unit 6, which can supply either hot air or cold air, is mounted at a tranversely central portion of the vehicle body, below the instrument panel 3.

A center console box 5 formed as a hollow tube is provided running along the longitudinal axis of the vehicle in its transversely central portion, and extends from under the instrument panel 3 to near the front edges of the front seats 1, terminating shortly before the front end of the parking brake lever 4. As best seen in FIG. 2, the air treatment unit 6 has a pair of side air outlets 7 which project sideways to left and right so as to blow treated air in the direction of people seated on the left and right front seats 1, and also has a lower air outlet 8 which projects downwards. An elbow shaped connecting tube 9 is connected at its one end to this lower air outlet 8 and is connected at its rear end to an aperture at the front end of the center console box 5, so as to lead treated air from the air outlet 8 into the internal space within the center console box 5. An internal channel shaped member 10 is mounted within the center console box 5, as best seen in the cross sectional view shown in FIG. 3, so as to define an air duct 11 down the central portion of the center console box 5.

The rear end of the center console box 5 is closed at its central portion and is formed with left and right openings 12 at its two side portions, said openings 12 communicating to the air duct space 11 defined within the center console box 5. The openings 12, as can be understood from FIG. 1, are in plan view proximate to the inner front corners of the respective front seats 1, and are next to the floor of the vehicle, so as to open towards the aforesaid underneath spaces under said front seats 1. Therefore, the treated air which is blown out from these openings 12 when the treatment unit 6 is operating and is expelling treated air through the air outlet 8 into the air duct space 11 is directed straight and immediately into these two underneath spaces under the two front seats 1, to be thence transmitted in the per se well known and conventional manner through these underneath spaces to the rear seating space to admix treated air to the air therein.

It is practically impossible for the feet of a person seated in either of the front seats 1 to obstruct this flow of treated air, because the air outlet openings 12 are located proximate to the underneath spaces under the front seats 1, and because the feet of persons in the front seats 1 as a matter of course tend to be placed a little to the front of the floor space in front of said front seats 1. Thus, treated air is well transferred to said rear seating space, and also the possibility of discomfort being caused to the feet of a person seated in either of the front seats 1 by undue amount of treated air being blown upon said feet is virtually eliminated.

Flap arrangements are provided for regulating the flow of treated air, as follows. A damper 13 is fixedly mounted on a rotatable shaft at an intermediate position within the air duct 11, and a knob 15 is fitted on a portion of this shaft which projects to the outside upper side of the center console box 5 for regulating the angular position of this damper 13 and for thus regulating the total amount of air flowing through the duct 11 and out of the openings 12. A second damper 14 is fixedly mounted on another rotatable shaft at a position within the air duct 11 near its rear end, and a knob 16 is fitted on a portion of this shaft which projects to the outside upper side of the center console box 5 for regulating the angular position of this damper 14 and for thus regulating the proportion in which the air flowing through the duct 11 and out of the openings 12 is divided between the left and the right opening 12. By this regulation of the proportion in which the treated air flowing through the duct 11 is directed through the left and the right opening 12, the flow of treated air to the rear seating space can be biased to the left or to the right of said rear seating space, according to the operator's desire. Further, in this preferred embodiment, a V-shaped baffle 17 is provided just downstream of the damper 14, for guiding the air streams which have been divided by this damper 14 towards their respective openings 12 and for thus ensuring smooth air flow.

According to the shown construction, the center console box 5 is thus utilized for two separate purposes, both in its normal function as a console box, and also for providing the structure of the air duct 11, and this efficiency of utilization ensures low cost for the construction and also uses a minimum amount of space within the passenger compartment. This construction achieves these beneficial effects although it does not utilize any special air duct under the top surface of the floor of the vehicle, and accordingly the floor of the vehicle behind the center console box 5 can be made flat, and no special volume within the passenger compartment is required for provision of any air duct in this area.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. An air duct for a vehicle, said vehicle having longitudinally arranged front and rear ends and incorporating a floor, a front instrument panel, an air treatment unit fitted under said instrument panel which provides treated air from an air outlet thereof, a front seating assembly mounted on said floor forming an underneath space defined between said front seating assembly and including side by side half portions thereof, and a rear seating assembly situated above said floor and defining a rear seating space including side by side half portions thereof, said air duct leading treated air from said air outlet of said air treatment unit to said rear seating space and comprising:

a hollow center console box extending along a transversely central portion of said floor of the vehicle in the longitudinal direction of the vehicle from a front end thereof connected with said air outlet of said air treatment unit to a rear end thereof located at a front side portion of and close to said underneath space so as to define an air flow passage, said center console box having formed therein at said rear end portion thereof first and second outlet openings opening respectively toward said side by side half portions of said underneath space so as to respectively supply flows of air principally to said side by side half portions of said rear seating space through said side by side half portions of said underneath space;

first damper means positioned in said center console box for controlling flow resistance of said air flow passage formed therein; and second damper means of a single plate member type positioned in said center console box at a transversely central portion thereof for variably dividing a flow of air flowing through said air flow passage into said flows of air supplied through said first and second air outlet openings, respectively.

2. The air duct according to claim 1, wherein said center console box has a duct structure of a substantially rectangular cross-section adjacent the rear end thereof, said rear end having a rear end wall narrower than a width dimension of said rectangular cross-section, and said first and second outlet openings formed at the rear end of said center console box being formed at opposite sides of said rear end wall.

3. The air duct according to claim 2, wherein said first and second air outlet openings are separated by a V-shaped baffle, and said second damper further comprises a plate member pivotably mounted on said center console box so as to pivot around an axis arranged along a joining edge of two planes defining said V-shaped baffle.

4. The air duct according to claim 3, further comprising means for directly turning said plate member of said second damper about said pivot axis.

* * * * *